US012680940B2

(12) United States Patent
Loveless et al.

(10) Patent No.: US 12,680,940 B2
(45) Date of Patent: Jul. 14, 2026

(54) FLOW-CELL ASSEMBLY INCLUDING A MODULAR FLOW-CELL UNIT

(71) Applicant: ABB Schweiz AG, Baden (CH)

(72) Inventors: Edis Loveless, Bristol (GB); Benjamin Carr, Stroud (GB); Jack Coughlan, Gloucester (GB)

(73) Assignee: ABB Schweiz AG, Baden (CH)

( * ) Notice: Subject to any disclaimer, the term of this patent is extended or adjusted under 35 U.S.C. 154(b) by 302 days.

(21) Appl. No.: 18/413,440

(22) Filed: Jan. 16, 2024

(65) Prior Publication Data

US 2024/0241034 A1      Jul. 18, 2024

(30) Foreign Application Priority Data

Jan. 16, 2023    (EP) ..................................... 23151833

(51) Int. Cl.
*G01N 15/14*        (2024.01)
*G01N 15/1434*      (2024.01)
(52) U.S. Cl.
CPC ................................ *G01N 15/1436* (2013.01)
(58) Field of Classification Search
None
See application file for complete search history.

(56) References Cited

U.S. PATENT DOCUMENTS 11,366,053 B2 *   6/2022   Jugert .................... G01N 21/05

FOREIGN PATENT DOCUMENTS

| CA | 320067 | * | 5/2022 |
| CA | 3200697 A1 | | 5/2022 |
| CN | 207351949 U | | 5/2018 |
| DE | 102018132453 A1 | | 6/2020 |

OTHER PUBLICATIONS

European Patent Office, Extended European Search Report in European Patent Application No. 23151833.0, 13 pp. (Jun. 29, 2023).

* cited by examiner

*Primary Examiner* — Eric S. McCall
*Assistant Examiner* — Nigel H Plumb
(74) *Attorney, Agent, or Firm* — Fitch Even Tabin & Flannery LLP

(57) ABSTRACT

A modular flow-cell unit includes a mechanical fixing interface configured for receiving a further modular flow-cell unit and also includes a fluid interface configured for receiving fluid from the further modular flow-cell unit or for transferring fluid to the further modular flow-cell unit. The modular flow-cell unit is configured to be connected to the further modular flow-cell unit for a flow-cell assembly including a first modular flow-cell unit and a second modular flow-cell unit. The modular flow-cell unit includes a lateral plate and a protruding edge. The modular flow-cell unit can be connected via a connection element insertable into the protruding edge of each of the modular flow-cell units.

12 Claims, 9 Drawing Sheets

FLOW-CELL ASSEMBLY INCLUDING A MODULAR FLOW-CELL UNIT

CROSS-REFERENCE TO RELATED APPLICATIONS

The instant application claims priority to European patent application Ser. No. 23/151,833.3, filed Jan. 16, 2023, which is incorporated herein in its entirety by reference.

FIELD OF THE DISCLOSURE

The present disclosure relates to a modular flow-cell unit, a flow-cell assembly, and the use of a modular flow-cell unit.

BACKGROUND OF THE INVENTION

Flow-cells are used for mounting specific sensors and controlling the flowrate by a flow controller. Usually, flow-cells are specialized to individual sensor parameters. It is difficult to find a flow-cell that is compatible with multiple sensor types. Use of a single flow-cell design for multiple sensor variants allows simplified manufacturing, fewer variants and cost reduction.

BRIEF SUMMARY OF THE INVENTION

There may be a desire to provide an improved flow-cell. The described embodiments pertain to the modular flow-cell unit and the flow-cell assembly. Synergetic effects may arise from different combinations of the embodiments although they might not be described in detail. It shall be noted that all embodiments of the present invention concerning a method, might be carried out with the order of the steps as described, nevertheless this has not to be the only and essential order of the steps of the method. The herein presented methods can be carried out in another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

According to a first aspect, a modular flow-cell unit is provided. The modular flow-cell unit comprises a mechanical fixing interface configured for receiving a further modular flow-cell unit, and a fluid interface configured for receiving fluid from the further modular flow-cell unit or for transferring fluid to the further modular flow-cell unit.

In other words, the modular flow-cell unit is a single unit intended to being connected to at least one further modular flow-cell unit. For that, it comprises a mechanical fixing interface, e.g. on one side or on two sides of the flow-cell unit. However, the modular flow-cell unit may also be used stand-alone, if the functionality of the further modules is not required. In order to be modular, it is required that each modular unit can be flowed through by the fluid, herein also called "sample". This means that the fluid can be passed from one modular unit to another modular unit, the fluid can flow through this unit and be passed to yet another modular unit, etc., so that a chain of modular units can be formed. Two connections are necessary to couple the units. The first concerns the attachment of the units to each other and the second concerns the connection of the flow. The two connections are interrelated because the fixing must ensure the flow of the liquid, and that the whole arrangement, especially the flow connection, is mechanically stable. A further connection might optionally be an electric connection, where "electric" may mean power, data, control signals, etc. Some of the electric connections may be achieved by a wireless connection.

BRIEF DESCRIPTION OF THE SEVERAL VIEWS OF THE DRAWING(S)

FIG. 1 is a diagram of a modular flow-cell unit in accordance with the disclosure.

FIGS. 2A, 2B, and 2C are diagrams of a modular flow-cell unit with a connection element in different views in accordance with the disclosure.

The figures are merely schematic representations and serve only to illustrate embodiments of the invention. Identical or equivalent elements are in principle provided with the same reference signs.

DETAILED DESCRIPTION OF THE INVENTION

Figure 1:
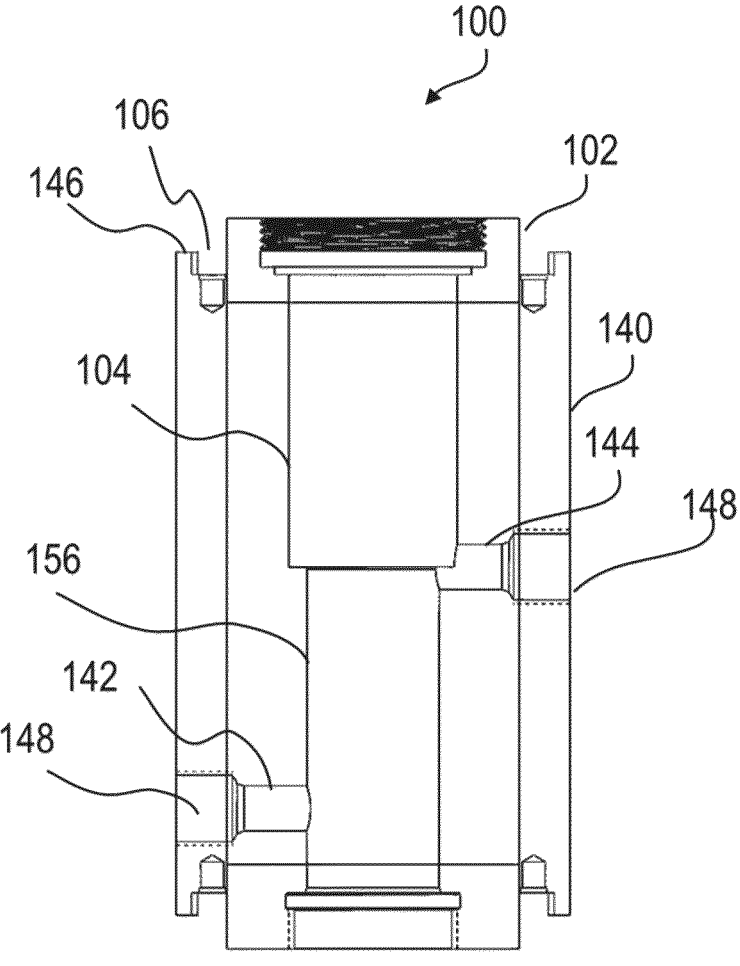

FIG. 1 shows a diagram of a modular flow-cell unit 100 with an inlet 142 and an outlet 144, a fitting 104 or sensor housing 104, and a pipe 156. The flow-cell unit 100 further has a housing 102 at which a fastening arrangement 140 as an example of the mechanical fixing interface 140 is disposed. The inlet 142 and the outlet 144 each have a fluid interface 148 for receiving fluid from the further module flow-cell unit as shown in FIG. 2C, and FIGS. 3 to 5, or for transferring fluid to the further module flow-cell unit.

The mechanical fixing interface 140 consists of a plate with a cuboid shape, which has protruding edges 146 at for example three sides, e.g. a front side and a top and bottom side. The front side is a side parallel to the longitudinal axis of the sensor housing 102 or the pipe 156, and the top or bottom sides are the sides adjacent to the front side. A distinction between the orientations "top" and "bottom" is not necessary here. The protruding edges 146 may also be present on the fourth side. The protruding edges 140 are located at the outer surface of the cuboid, such that a gap 106 is formed between the protruding edges 146 and the housing 102 of the flow-cell unit 100, 100', 100". The protruding edge 146 and the gap 106 serve for receiving a fastening clip 200 or bracket 200 as shown in FIG. 2. The top and bottom sides, where, for example, the protruding edge 146 and the gap 106 are located, and the front side and rear side are referred to as "narrow sides" or circumferential sides of the plate in this disclosure.

Figure 2A:
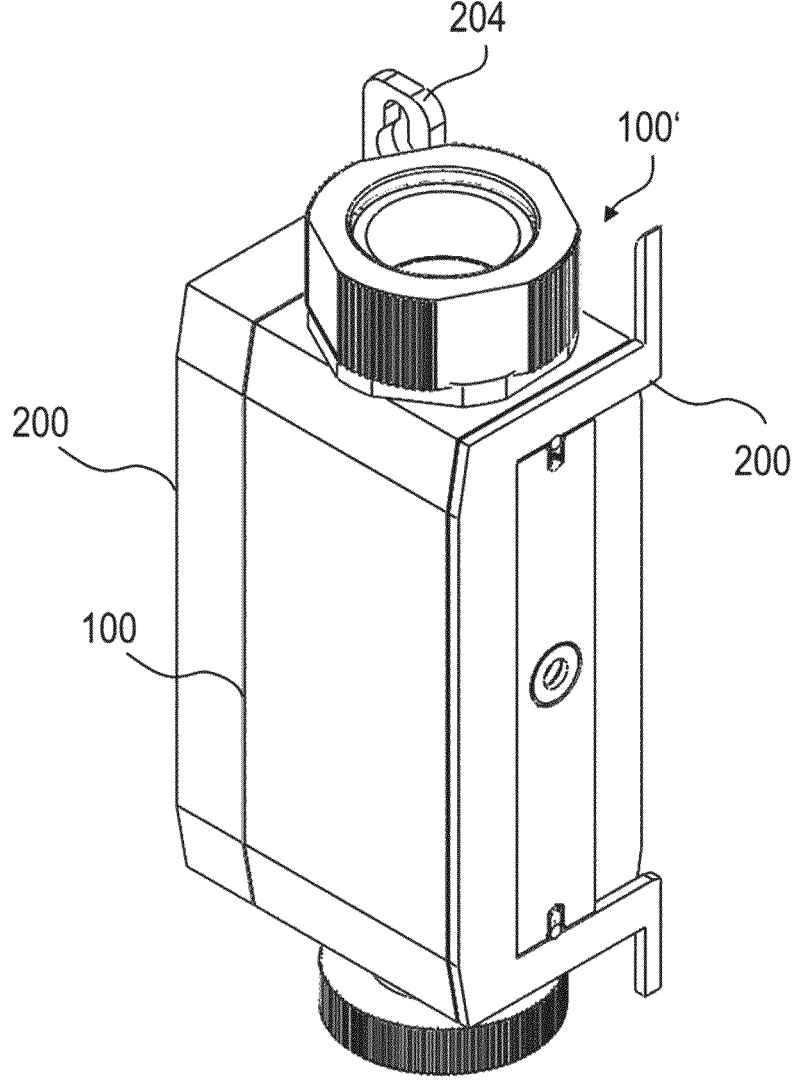
Figure 2B:
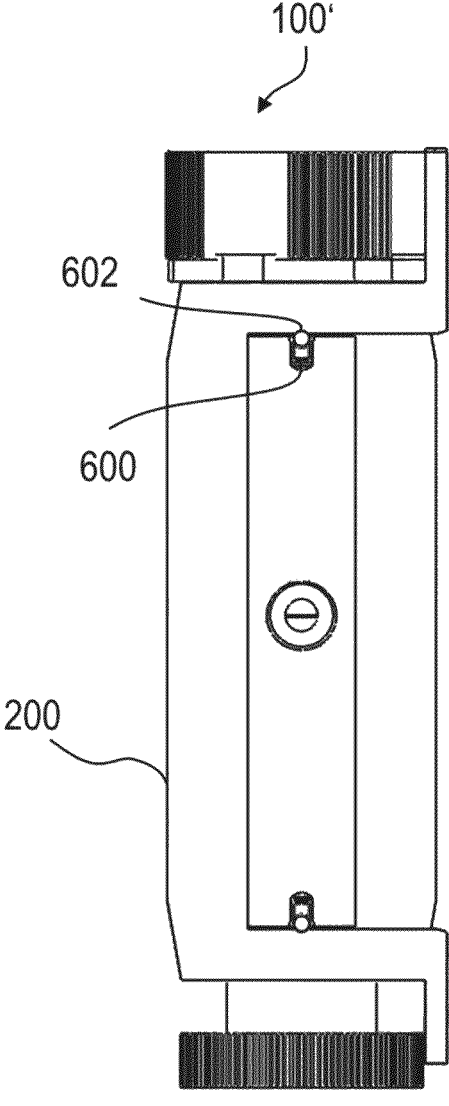
Figure 2C:
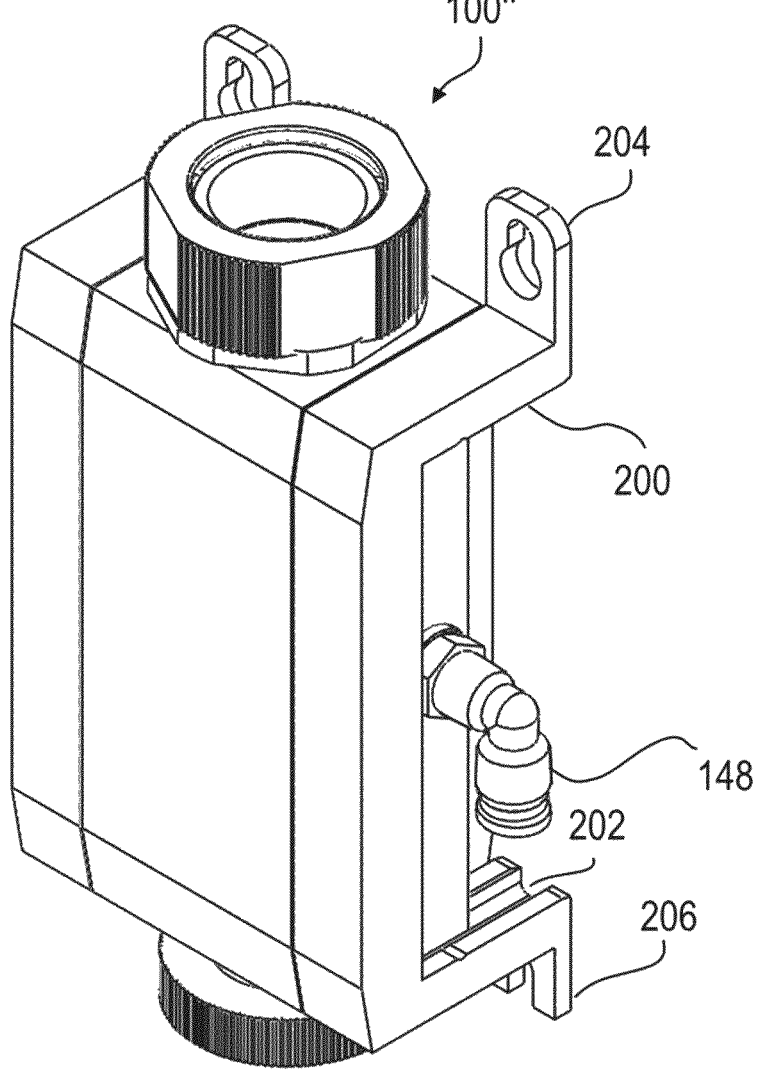

FIGS. 2A to 2C show diagrams of a connection element 200 or bracket 200 in different views. The connection element 200 or bracket 200 holds two modular flow-cell units such as modular flow-cell units 100, 100', 100" shown in FIGS. 3 and 4, together. In FIG. 2A, the bracket 200 is shown in a cut view. In FIG. 2B, the modular flow-cell unit 100' is shown in a side view. FIG. 2C shows a spigot 148 or tap 148 mounted at a modular flow-cell unit 100" that might be a modular end cell at which no further modular flow-cell unit will be connected. The bracket 200 has a shape that is complementary to the protruding edges 146 and the gaps 106 of the three sides of two adjacent flow-cell units 100, 100', 100", whose outer surfaces of their plate 140 lay side by side. That is, the bracket 200 has an essentially rectangular U-shape with a slot 202 running along the inner side of the "U". The slot 202 receives the protruding edges 146 of the two adjacent plates 140 of two flow-cell units 100, 100', and 100". From view of the flow-cell units 100, 100', 100", the gaps 106 of the two adjacent plates 140 receive the edges forming the slot 202 of the bracket 200. Thus, the slots 202 in the bracket 200 allow to slide the bracket over the features on the module 100, 100', 100" to hold two modules 100, 100', 100" together.

At both end sides, the bracket 200 has a plate 204, 206 such that the bracket 200 can rest against a wall. The plate 204 of at least one side has a hole, for example a keyhole-shaped mounting hole for mounting the bracket 200 with a screw or a hook at the wall. Especially, by the keyhole shaped mounting hole, the flow-cell unit 100, 100', and 100" can be attached and removed from the wall without any tools.

On at least one side, the bracket 200 may have a retention feature on bottom of bracket 200 to let the user know when the bracket 200 is fitted correctly. The retention feature 206 may be realized by a latching mechanism that ensures the correct fitting of the bracket 200 on the plate 140. For example, the latching mechanism consists of protrusions at the edge between plate and the body of the bracket 200 where the non-protruding edge of plate 140 at gap 106 can snap in, forming a fastening clip. A more preferred retention feature is shown in FIGS. 2B, and 6 to 8.

Figure 3:
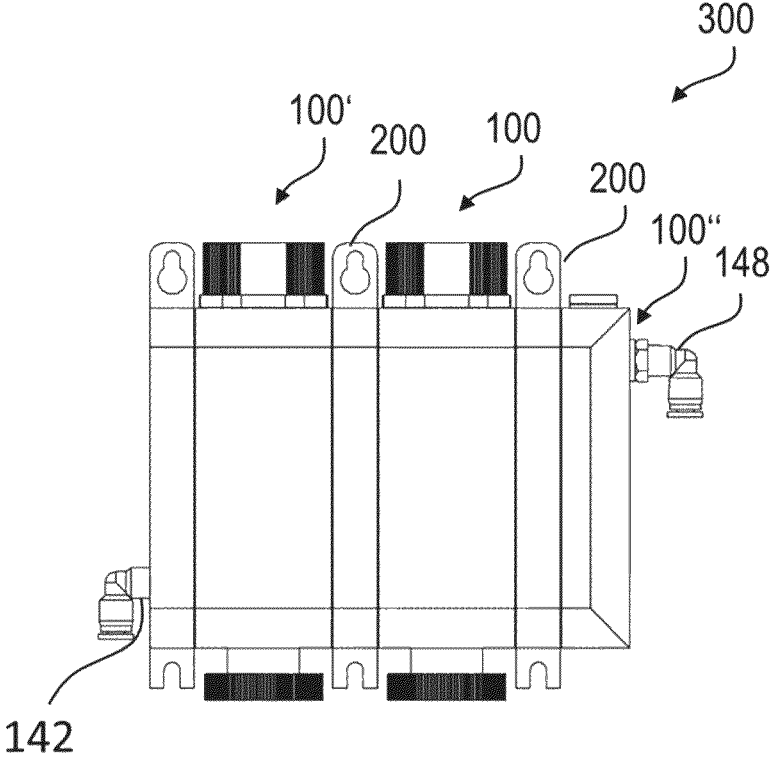
FIG. 3 is a diagram of a flow-cell assembly with two modular flow-cell units in accordance with the disclosure.

FIG. 3 shows a diagram of a flow-cell assembly 300 where two modular flow-cell units 100, 100' are attached to each other using the fastening clip/bracket 200 as illustrated in FIGS. 2A to 2C and spigots 142, 148 at the sides. The connections and interfaces between the flow-cell units 100 and 100' are shown in FIGS. 4 and 5.

The modular flow-cell unit 100' on the left in FIG. 3 may be a flow control module 100'. This module 100' is designed to assist the user in controlling the flowrate passing through the flow-cell(s). It may made of the following devices and functionalities: Sample inlet 142, a grab sample port for taking a sample for sensor calibration, a control valve, for example a needle valve for fine control over flowrate, an out of sample float switch for indicating to the user if the flowrate is too low; and sample outlet 144 and spigot 148.

The modular flow-cell unit 100 on the right may be a sensor module. It allows fitting of any sensor that is contained within the ¾" sensor body. The sensors may be pH-, ORP-, Chlorine-, Dissolved Oxygen-, or other sensors.

Figure 4:
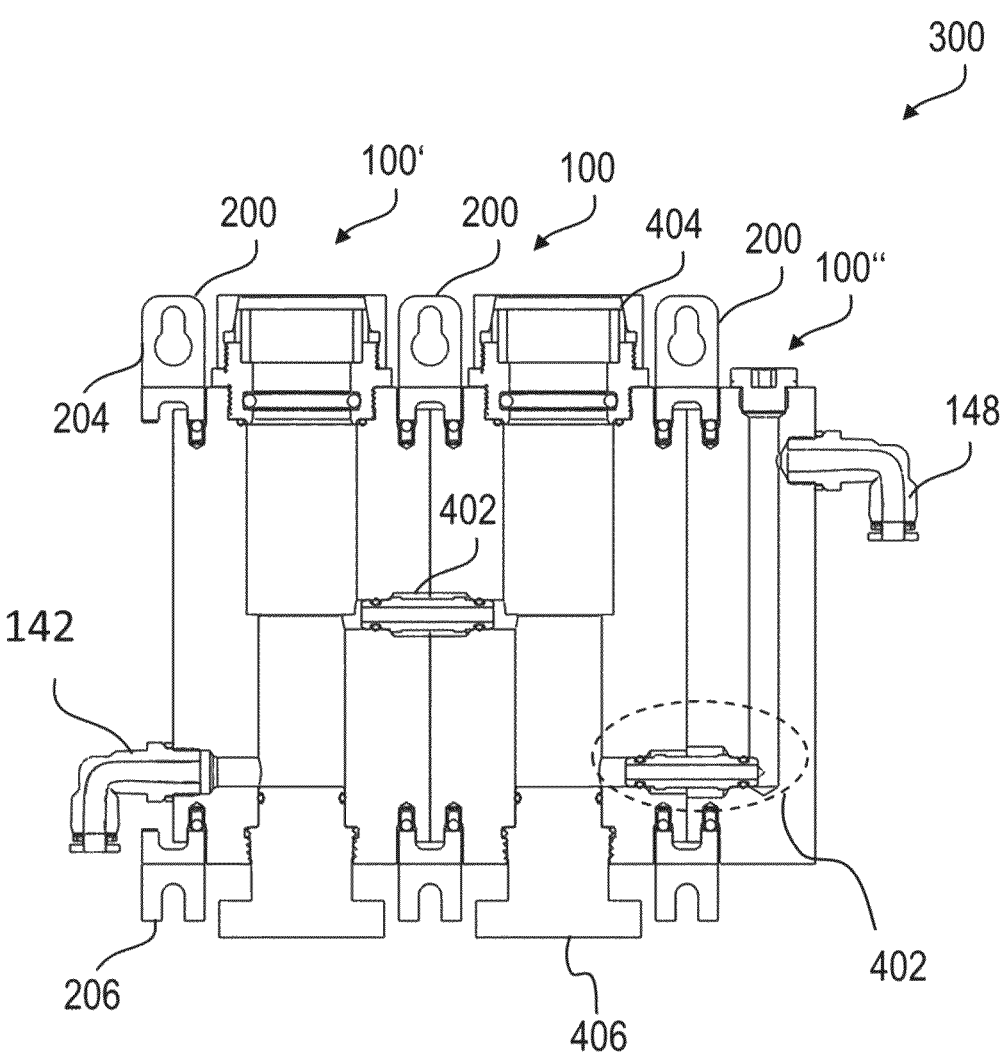
FIG. 4 is a diagram of a flow-cell assembly with three modular flow-cell units in accordance with the disclosure.
Figure 5:
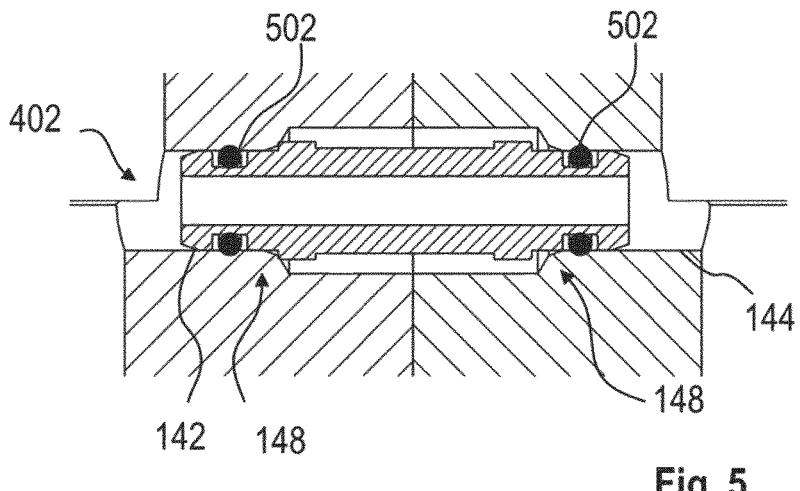
FIG. 5 is a diagram of a fluid interface in accordance with the disclosure.

FIG. 4 shows diagram of a flow-cell assembly 400 where three modular flow-cell units 100, 100', 100" are attached to each other, again using the bracket 200 described above. In the middle, there are two units 100, 100' as described above, which are connected in series using the mechanical interface 200 and the fluid interface 402, that is, the spigot system 402. The outer flow-cell units are a flow control unit 100', and a further unit 100", depicted with an outlet near the top. Such a further unit 100" may be, for example, a pump module, a valve module, a filtration module, an energy harvesting module, a chlorine zero calibration module, a verification module, or a temperature control module, which have been described above.

The modular flow-cell units 100 are also modules that have top 404 and bottom 406 plugs. The bottom plug 406 can either just be blocked off as shown in FIG. 4, or a stirrer module could be fitted. Further plugs may be fitted. The top plug 404 allows the ¾" sensor to be fitted, but can also be modified to allow different sized sensors to fit, such as a PG13.5 pH sensor.

FIG. 5 shows a diagram of the fluid interface 402 of depicted in FIG. 4 in more detail. The fluid interface 402 is realized as a spigot system 402, which is placed between the sections of two modular flow-cell units 100, 100', 100". This spigot 148 contains a seal 502 onto both modules that are being connected together. This seal 502 is arranged such that pressure within the system 402 does not cause the modular flow-cell units 100, 100', 100" to push each other apart, so the brackets 200 do not need to apply any compression to the system.

Figure 6:
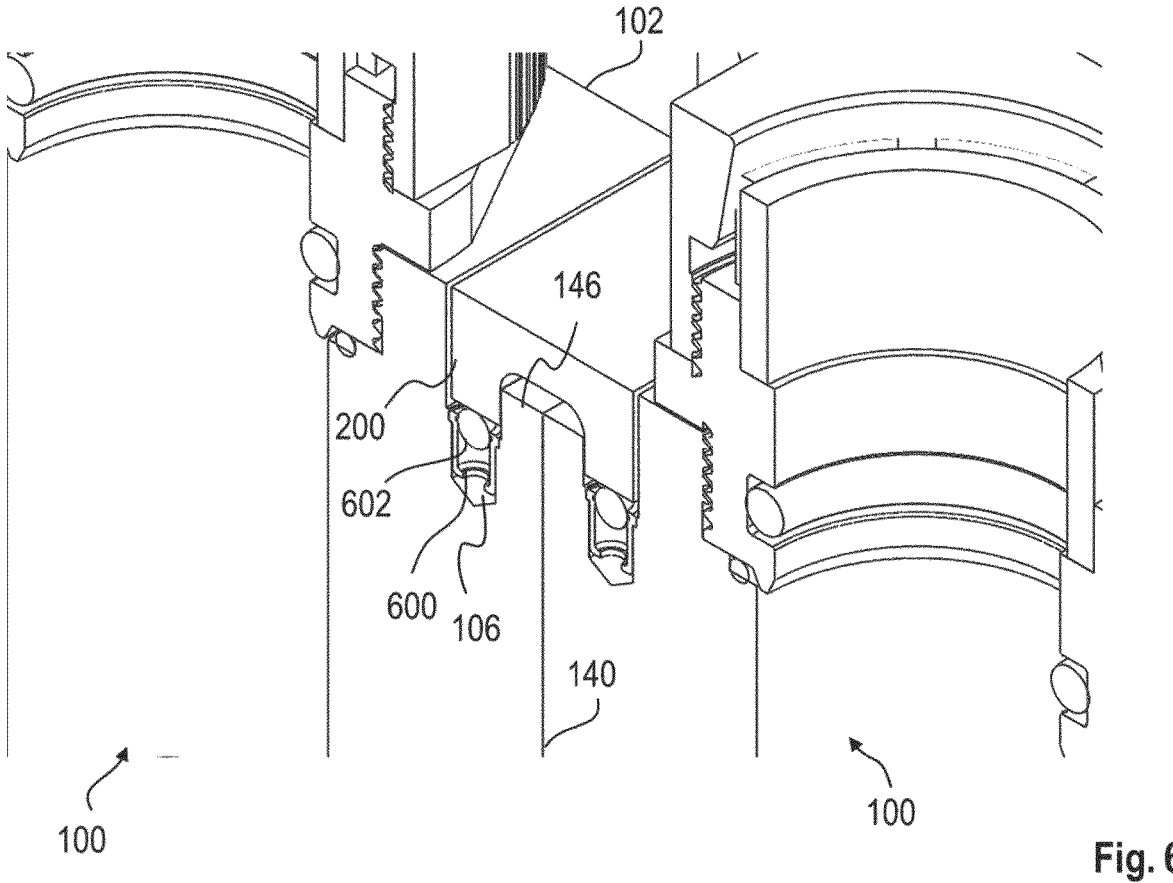
FIG. 6 is a diagram of a mounted connection element in accordance with the disclosure.
Figure 7A:
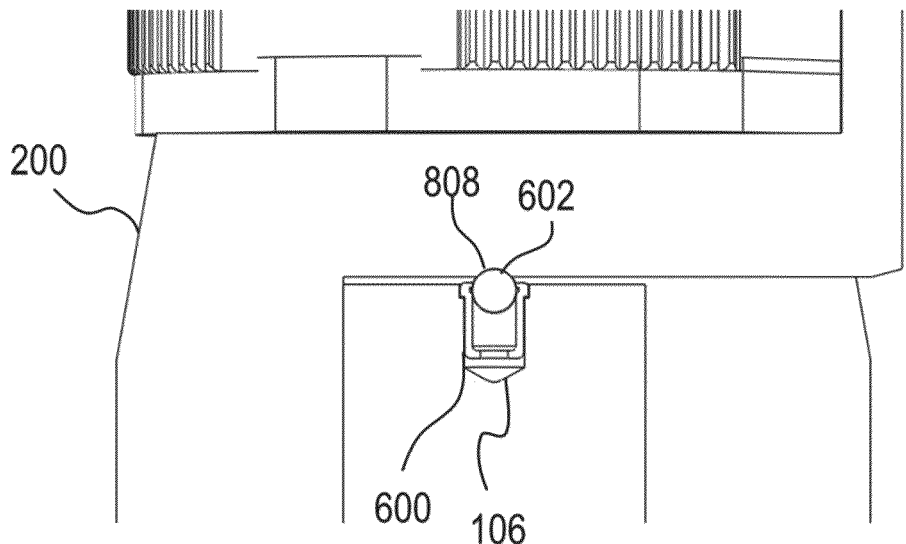
FIGS. 7A and 7B are diagrams of a spring-loaded pin in accordance with the disclosure.
Figure 7B:
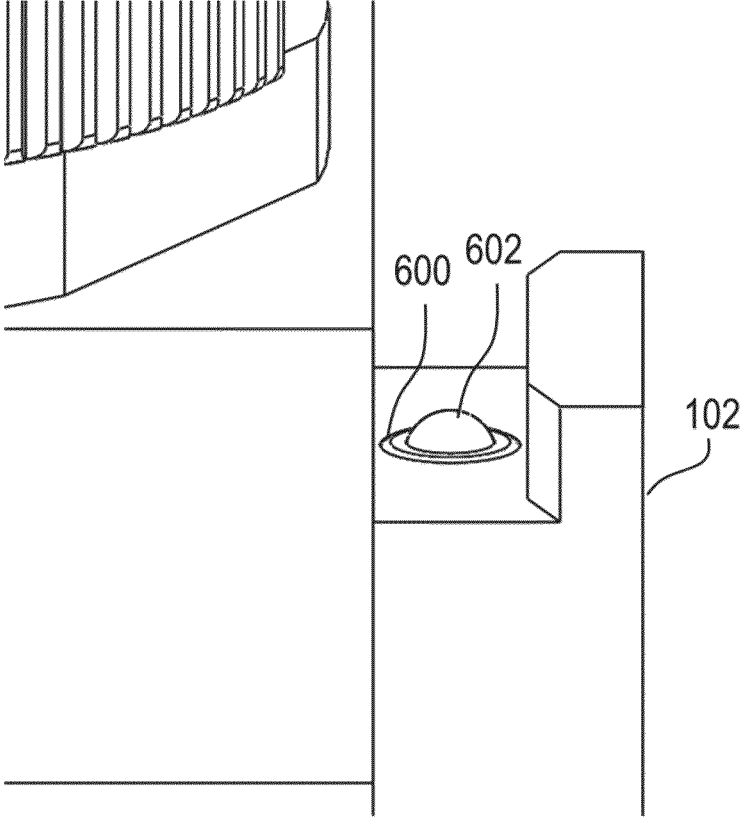
Figure 8:
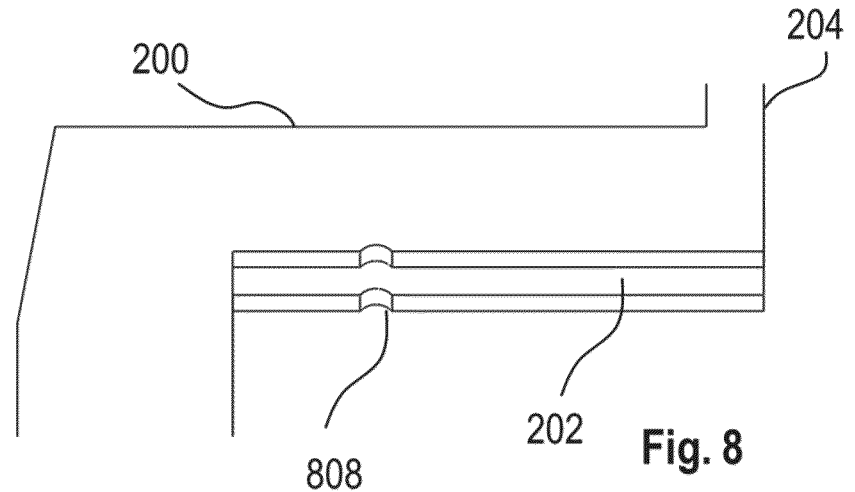
FIG. 8 is a diagram of a connection element in accordance with the disclosure.

FIGS. 6, 7A, 7B, and 8 show embodiments with a spring-loaded pin 600 or spring plunger 600 for retaining the bracket 200. FIG. 8 shows a part of a bracket 200, which is the connection element that connects two modular flow-cell units with each other. The bracket 200 is U-shaped and has a groove 808 on each of the opposite sides. FIG. 6 shows a sectional view at the plane that intersects the spring-loaded pins 600. The spring-loaded pins 600 are inserted in the gap or groove 106 of plate 140. The plate 140 may be separate from or integral with the housing 102. Further, the plate 140 may form one side of the housing 102, i.e. be a part of the housing 102. In FIG. 6, the bracket 200 is pulled over the protruding edge 146 of the plate 140. The spring-loaded pin 600 comprises an elastic element such as a spring (not shown in FIG. 6) that pushes a ball 602 out of the groove 106. The bracket sticks the plates 140 or sides of the housings 102 at least at two edges, e.g. the top and bottom edges, preferably at three edges, e.g. additionally the front edge, together. When slipping the bracket from the front side over the top and bottom edges, the bracket 200 pushes the ball 602 of the spring-loaded pin 600 down until the grooves 808 in the bracket 200 reach the position of the spring-loaded pins 600. At this position, the ball of the spring plunger 600 is pressed into the groove by the preload of the spring and retains the bracket 200 at this position. Instead of a ball, elements with another shape could be used. The elements can, for example, be cuboid-shaped and have rounded or flattened edges so that the element can slip into the groove and also slip out of the groove when the clamp is removed. The inclination of the edges can be different so that the element can slide in easily but can only be removed again with a certain amount of force.

FIG. 7B shows an oblique top view of the spring plunger 600 embedded in the groove 106 of the plate or the gap 106 of the housing 102. The spring plungers 600 are arranged in every modular flow-cell unit, i.e. in all flow-cell regulator and end cell sections. FIG. 7A shows a diagram of the mounted connection element in a side view and the spring-loaded pin. The reference numbers for the elements correspond to the reference numbers of the previous figures.

Other variations to the disclosed embodiments can be understood and effected by those skilled in the art in practicing the claimed invention, from the study of the drawings, the disclosure, and the appended claims. In the claims, the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

The modular flow-cell units may be used in isolation. The design allows individual cells to be mounted directly to fluid hoses. In this case, the brackets are not used to attach the modular flow-cell unit to the side of other components, but only to attach the modular flow-cell unit to the customer's wall, bracket, or panel, etc.

The modular flow-cell units may also be used with other modular flow-cell units, end cells, that is, modular flow-cell units that have a fluid interface or spigot for connecting to another modular flow-cell unit only on one side, or regulators using the spigot part as an intermediary fluid connection.

According to an embodiment, the mechanical fixing interface comprises a lateral plate enclosed with a protruding edge into which a connection element can be inserted.

The connection element may be for example a bracket. "Lateral" addresses those sides of the flow-cell unit where the inlet and/or the outlet for the fluid is located. The inlet and the outlet may be located at opposite sides, although this is not a requirement. For example, the outlet side may be located at the side adjacent to the inlet side, which form a 90° angle. In case of lateral inlet and outlet sides, these sides may also be denominated "left" and "right" sides from view of a front side. "Backside" may be defined to be the side facing to a wall to which the flow-cell unit may be mounted, and the front side is then consequently the remaining side opposite to the backside. The plates may be located at the left and/or right sides, where the further modular flow-cell units can be attached to the modular flow-cell unit. The outer surface of a plate may be longer and/or wider than the main body of the plates such that protruding edges are formed. The adjacent edges of the flow-cell unit and a further flow-cell unit to be connected to the flow-cell unit may then form a common pair of edges. A bracket having a longitudinal slot can be moved over this pair of edges such that the pair of edges slips into the slot. In this way, the edges are kept together and the flow-cell units are fixed to each other. Other fixing arrangements may be applied. This bracket/plate can then be used to mount the joined units to a wall or other bracket. Other mounting arrangements and locations may be applied. The plates may be formed by the housing. That is, the plates may be integral with the housing and a part of the housing, such that they form the wall of the modular flow-cell unit. The plate or the wall are therefore configured for laterally abutting with a further modular flow-cell unit if the further modular flow-cell unit is received by the mechanical fixing interface.

According to an embodiment, one of the narrow sides, i.e., circumferential sides, of the plate or the wall comprises a spring-loaded pin for fixing a connection element to the modular flow-cell unit. The narrow side may have a groove or a gap, in which the spring-loaded pin is embedded.

The connection element may be a bracket as described above. The spring-loaded pin or spring plunger may comprise a lock element such as the pin itself, a ball-like element, a cuboid-shaped element or another suitable element, which is pressed against the force of the spring into the groove or gap at one of the narrow sides of the plate when the connection element is moved over the protruding edges. At a position of the connection element, where the groove of the connection element faces the spring-loaded pin, the lock element is pressed by the force of the spring into the groove of the connection element such that the connection element is removable locked. Preferably, there are spring-loaded pin s on opposite sides of the narrow sides of the plate, e.g. a top side and a bottom side.

According to an embodiment, the modular flow-cell unit further comprises a sample inlet configured to be connectable to a sample outlet of a further modular flow-cell unit and a sample outlet configured to be connectable to a sample inlet of a further modular flow-cell unit, and/or an electrical interface to a further modular flow-cell unit.

The sample inlet may receive the sample either from another modular flow-cell unit or from an external source. In order to receive the sample from another modular flow-cell unit, it has to be connectable to the outlet of another modular flow-cell unit. Accordingly, the sample outlet outputs the sample either to another modular flow-cell unit or to an external sink.

The inlets and outlets may therefore be arranged at such heights or locations that a chain can be built. The fluid can pass from one to another flow-cell unit, and also through these units to further units. If a flow-cell requires the inlet and outlet to be at different heights, the cells may be constructed such that an inlet may be used also as outlet and vice versa. For example, two identical cells can be connected by turning one of the cells by 180° such that, from a front view, the left and backside of the second cell, turns to be the right and the front side. Then, the outlet of the first cell is on the same height as the inlet of the second cell, or vice versa.

Alternatively, or in addition, the cells may have a plurality of inlets/outlets on one side, which can be used as required by an application. Further, a specialized flow-cell unit may have inlets or outlets at individual heights.

Furthermore, a flow-cell unit may be designed to be a modular end cell, which is connectable only on one side to another modular flow-cell unit.

Moreover, the flow-cell unit may comprise an electrical interface to a further modular flow-cell unit. The electrical interface may provide control lines for control signals, data lines and/or power lines.

According to an embodiment, the modular flow-cell unit is a sensor flow-cell unit, herein also referred to as "sensor module" comprising a fitting that is configured to receive a sensor.

The sensor flow-cell unit is therefore not only modular with respect to further flow-cell units but also with respect to its sensor functionality. For example, the sensor flow-cell unit may comprise only a fitting for a sensor not including the sensor. The sensor can be installed later. The fitting is independent on the type of sensor to be fitted so that different types of sensors may be received by such a universal fitting. However, the sensor may be already integrated into the fitting when assembling the flow-cell module and therefore be part of the sensor flow-cell unit.

There may be different sensor flow-cell units for different sensor body size categories or shape categories.

According to an embodiment, the sensor flow-cell unit comprises a sensor for sensing one of: a pH concentration, an oxidation-reduction potential (ORP), a chlorine concentration, or a dissolved oxygen concentration.

The fitting allows, for example, receiving any sensor that is contained within a ¾"-sized fitting or "sensor body". For example, pH-, ORP-, chlorine-, and dissolved oxygen-sensors as well as other sensors are suitable for such a fitting.

According to an embodiment, the modular flow-cell unit is a flow control module comprising a flow control arrangement or a sensor module.

In other words, the modular design makes it possible to separate the flow control from the sensor system and thus integrate a number of functions into this flow cell. The flow control module indicates as an example such specialization for the flow control functions. Nevertheless, also in the sensor module further functionalities may be integrated.

According to an embodiment, the flow control arrangement comprises a needle valve, a grab sample port and/or an out-of-sample float switch.

The needle valve may be used for fine controlling the flowrate. The grab sample port may be used for taking a sample for sensor calibration, and the out-of-sample float switch may be used, for example, for indicating to the user if the flowrate is too low.

That is, due to the modular design, there exists much more room for adding functionalities to the flow control arrangement. It is possible to integrate these functional arrangements into a single module, and it is further possible to have only one or two of these functional arrangements in the modular flow-cell unit. This allows having the respective remaining functional arrangements in further modular flow-cell units, which may be connected to the flow-cell unit only if required.

As already described, each modular flow-cell unit has a sample inlet and a sample outlet, which therefore applies also to the modular flow-cell unit with the flow control arrangement.

According to an embodiment, the modular flow-cell unit is one of a pump unit configured to add additional chemicals into the fluid, mixing of such chemicals, and/or monitor fluid usage, a valve unit configured to control valves, i.e., for example to open or close valves, a filtration unit configured to filtrate the fluid and/or to perform filter diagnostic functions, an energy harvesting unit configured to generate electricity from the sample flow, a chlorine zero calibration unit configured to remove chlorine from the fluid for calibrating a chlorine sensor, a verification unit configured to calibrate and check an optical sensor, and a temperature control unit configured to control the temperature of the sample flowing through the flow-cell.

A pump unit could be envisaged where a pump is used to add additional chemicals into the flowing system. For example, cleaning solutions may be added automatically to perform chemical cleaning of the sensors and flow-cell to stop the build-up of contaminants. In another example, buffer chemicals may be added to control the pH value of the solution flowing through the flow-cell to obtain more stable readings for parameters that are pH sensitive. In a further example, calibration chemicals may be added to automatically pump in a calibration standard and perform a sensor calibration without operator input. This unit could also perform the mixing of such chemicals, and perform a monitoring of fluid usage etc.

A valve unit could be envisaged that could allow the system to control which valves are to be open or closed. This could be used to allow for multiple sample lines to be sampled by a single set of sensors. For that, the valve unit may comprise more than one inlet, to which sample lines are connected, and which are led to one or more than one outlet. Each sample line may have a valve that may be controlled by a controller to open or close the line. The valve unit could also be used in conjunction with the pump module to allow for pumping a variety of different chemicals, for example to perform multi point calibrations.

A filtration unit could allow the system to be used with samples that contain a higher particulate load. The filtration unit could be self-cleaning with backflush capability, and could also have diagnostics telling the user when to replace the filter and/or clean the filter etc.

An energy harvesting unit containing a small turbine could generate electricity from the sample flow. The generated energy could be used, for example, for powering low power electrochemical sensors such as pH- or chlorine-sensors or for other low power applications such as wireless low power communication.

A zero chlorine calibration unit can be used to perform zero chlorine calibrations by switching the flow to pass through a carbon filter. This removes all chlorine from the sample, so that a zero chlorine calibration can be performed by the sensor. This functionality could be incorporated into a special flow-cell unit so that external parts would not be required.

Regarding the verification unit, some optical sensors can be calibrated and/or checked with solid standards. A modular flow-cell unit could be created that automatically moves these solid standards into the optical path of the optical sensor, so allowing for an automatic check of functionality of these types of sensors. The verification functionality may be realized by a linear actuator and an optical standard for performing the checks.

Further, the modular flow-cell unit could be a temperature control unit that controls the temperature of the sample flowing through the flow-cell. The temperature control unit could be used for processes with rapidly changing temperatures, and for sensors that are sensitive to changes in process temperature. It could also be used if the chemicals being measured are not measurable without some form of temperature controlled digestion stage.

According to a further aspect, a flow-cell assembly is provided that comprises a first modular flow-cell unit as described herein and a second modular flow-cell unit as described herein. The first modular flow-cell unit and the second modular flow-cell unit are connectable to each other for providing a common flow of a sample through the first modular flow-cell unit and the second modular flow-cell.

In other words, the flow-cell may be assembled of two modular parts, herein referred to as "modular flow-cell units" that are connected to each other. Each part may provide a different functionality. However, they may also provide the same or similar functionalities such as a sensor functionality with different sensors. The flow-cell assembly comprises such a combination. In an example, the first modular flow-cell unit is a sensor flow-cell unit and the second modular flow-cell unit is a flow control unit or another modular flow-cell unit as described herein.

According to an embodiment, the flow-cell assembly comprises a connection element, for example a bracket, configured to mechanically fix two cells together.

The connection element or bracket holds two adjacent cell units together and ensures that the inlet/outlet connections do not break.

According to an embodiment, the connection element is a U-shaped bracket, comprising grooves for receiving the protruding edges of the plates of the first and second modular flow-cell units, and grooves, recesses or holes on opposite sides of the "U" for receiving load springs.

The connection element consist of U-shaped rectangular bars with a continuous slot into which the protruding edges of the plates are moved. The groove or recesses for the spring-loaded pin are located on the walls of the slot, and are for example transverse to the slot. Alternatively instead of grooves or recesses, the bars may comprise holes to receive the spring-loaded pins.

Alternatively, the flow-cell assembly comprises a fastening clip. The fastening clip may be arranged on the end sides, i.e., the outer sides of the outer units where no further cell is attached to so that the utmost right and left units are securely fixed.

The connection element may further have a keyhole shaped mounting hole for attaching removable the flow-cell arrangement to a wall. That is, the flow-cell arrangement can be attached and removed from the wall without any tools. The keyhole shaped mounting hole, allows a simple mounting of the complete flow-cell arrangement to, for example, a wall.

According to an embodiment, the connection element comprises a slot allowing the connection element to slide over the mechanical fixing interface to hold two flow control units together. For example, the plates comprise protruding edges on their outer sides that fit into the slots, on two adjacent flow control units.

The flow-cell assembly may further comprise a control unit for controlling electronic and electro mechanic parts.

The control unit may also be a modular flow-cell unit, or it may be integrated into a modular flow-cell unit with further functionalities. In further embodiments, it may be located external to the modular flow-cell units. For example, it could be an application on a computer, a smart phone, a tablet, or it could be a dedicated control device. The control unit may further comprise a human-machine interface with a display and/or keypad or other input/output devices for use by an operator. Further, it may comprise a control interface, interfacing the flow-cell units for sending control signals and/or for receiving, for example, status signals or monitoring signals. The control unit may alternatively located, for example, within the sensor flow-cell unit, which may be seen as a central unit. Further, under the term "control unit" may be understood—not necessarily but also—the totality of sub-control units, where a sub-control unit may be a controller for valves or other actuators, for a display, for a power switch, for a communication device, etc.

According to a further aspect, a use of a flow-cell unit as a modular flow-cell unit is provided.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE NUMERALS

100, 100', 100" modular flow-cell units
102 housing of the modular flow-cell unit
104 fitting, sensor housing
106 gap/groove between the housing of the modular flow-cell unit and the protruding edge
146 of the plate 140
140 mechanical fixing interface, lateral plate
142 sample inlet
144 sample outlet
146 protruding edge of the plate
148 fluid interface, spigot
156 pipe connecting the inlet with the outlet
200 connection element, fastening clip, bracket
202 slot/groove of the bracket
204 (plate with) keyhole-shaped mounting hole
206 latching mechanism, retention feature
300 flow-cell assembly
402 fluid interface/spigot system
404 top plug
406 bottom plug
502 seals of the spigots
600 spring-loaded pin
602 ball
808 groove in bracket

What is claimed is:

1. A modular flow-cell unit, comprising:
a mechanical fixing interface configured for receiving a further modular flow-cell unit; and
a fluid interface configured for receiving fluid from the further modular flow-cell unit or for transferring fluid to the further modular flow-cell unit,
wherein the mechanical fixing interface comprises a lateral plate having a protruding edge, wherein a connection element is insertable into the protruding edge and encloses the protruding edge and the lateral plate,
wherein the lateral plate is formed on a face of the flow-cell unit where a sample inlet and/or a sample outlet for the fluid is located, and wherein the sample inlet is configured to be connectable to a sample outlet of the further modular flow-cell unit and the sample outlet is configured to be connectable to a sample inlet of the further modular flow-cell unit, wherein the lateral plate is configured for laterally abutting with the further modular flow-cell unit when the further modular flow-cell unit is received by the mechanical fixing interface.

2. The modular flow-cell unit according to claim 1, wherein the lateral plate has at least two narrow sides, and wherein one of the two narrow sides of the lateral plate comprises a spring-loaded pin configured for fixing a connection element to the modular flow-cell unit when the connection element is moved over the protruding edge.

3. The modular flow-cell unit according to claim 1, wherein the modular flow-cell unit is a sensor flow-cell unit comprising a fitting that is configured to receive a sensor.

4. The modular flow-cell unit according to claim 3, wherein the sensor flow-cell unit comprises a sensor for sensing one of: a pH concentration, an Oxidation-Reduction Potential, a chlorine concentration, or a dissolved oxygen concentration.

5. The modular flow-cell unit according to claim 1, wherein the modular flow-cell unit is a flow control module comprising a flow control arrangement or a sensor module.

6. The modular flow-cell unit according to claim 5, wherein the flow control arrangement comprises:

a control valve;

a grab sample port; and an out-of-sample float switch.

7. The modular flow-cell unit according to claim 1, wherein the modular flow-cell unit is one of:

a pump unit configured to add additional chemicals into the fluid, mixing of such chemicals, and/or monitor fluid usage;

a valve unit configured to control valves;

a filtration unit configured to filtrate the fluid and/or to perform filter diagnostic functions;

an energy harvesting unit configured to generate electricity from a sample flow;

a chlorine zero calibration unit configured to remove chlorine from the fluid for calibrating a chlorine sensor;

a verification unit configured to calibrate and check an optical sensor; and a temperature control unit configured to control the temperature of the sample flowing through the modular flow-cell unit.

8. A flow-cell assembly, comprising:

a first modular flow-cell unit and a second modular flow-cell unit, each modular flow-cell unit comprising:

a mechanical fixing interface configured for receiving a further modular flow-cell unit; and a fluid interface configured for receiving fluid from the further modular flow-cell unit or for transferring fluid to the further modular flow-cell unit, wherein the mechanical fixing interface comprises a lateral plate having a protruding edge, wherein a connection element is insertable into the protruding edge and encloses the protruding edge and the lateral plate, wherein the lateral plate is formed on a face of the flow-cell unit where a sample inlet and/or a sample outlet for the fluid is located, and wherein the sample inlet is configured to be connectable to a sample outlet of the further modular flow-cell unit and the sample outlet is configured to be connectable to a sample inlet of the further modular flow-cell unit, wherein the lateral plate is configured for laterally abutting with the further modular flow-cell unit when the further modular flow-cell unit is received by the mechanical fixing interface, and wherein the first modular flow-cell unit and the second modular flow-cell unit are connectable to each other for providing a common flow of a sample through the first modular flow-cell unit and the second modular flow-cell, wherein the flow-cell assembly comprises a connection element for mechanically fixing the first modular flow-cell unit and the second modular flow-cell unit together.

9. The flow-cell assembly according to claim 8, wherein the flow-cell assembly further comprises a connection element for mechanically fixing the first and second modular flow-cell units together.

10. The flow-cell assembly according to claim 9, wherein the connection element is a rectangular U-shaped bracket including a slow running along an inner side of the rectangular U-shaped bracket for receiving protruding edges of adjacent plates of the first and second modular flow-cell units and grooves recesses or holes on opposite sides of the "U" for receiving the spring-loaded pin.

11. The flow-cell assembly according to claim 9, wherein the connection element has a keyhole shaped mounting hole for attaching removable the flow-cell assembly to a wall.

12. The flow-cell assembly according to claim 9, wherein the connection element comprises a slot allowing the connection element to slide over the mechanical fixing interface of two adjacent flow control units to hold two modular flow-cell units together.

* * * * *